United States Patent
Himane et al.

(10) Patent No.: US 11,915,097 B1
(45) Date of Patent: Feb. 27, 2024

(54) VISUAL MARKER WITH USER SELECTABLE APPEARANCE

(71) Applicant: Apple Inc., Cupertino, CA (US)

(72) Inventors: Mohamed Selim Ben Himane, Milpitas, CA (US); Anselm Grundhoefer, Saratoga, CA (US); Arun Srivatsan Rangaprasad, Sunnyvale, CA (US); Jeffrey S. Norris, Saratoga, CA (US); Paul Ewers, San Francisco, CA (US); Scott G. Wade, Santa Clara, CA (US); Thomas G. Salter, Foster City, CA (US); Tom Sengelaub, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/143,411

(22) Filed: Jan. 7, 2021

Related U.S. Application Data

(60) Provisional application No. 62/960,796, filed on Jan. 14, 2020.

(51) Int. Cl.
*G06K 9/18* (2006.01)
*G06K 7/14* (2006.01)
(Continued)

(52) U.S. Cl.
CPC ......... *G06K 7/1443* (2013.01); *G06K 7/1417* (2013.01); *G06K 7/1456* (2013.01); *G06N 20/00* (2019.01); *G06T 7/90* (2017.01)

(58) Field of Classification Search
CPC ..... G06T 2207/1004; G06T 9/00; G06T 1/20; G06Q 20/405; G06Q 20/3276
(Continued)

(56) References Cited

U.S. PATENT DOCUMENTS 7,769,236 B2   8/2010   Fiala
7,809,194 B2   10/2010   Zhang et al.
(Continued)

FOREIGN PATENT DOCUMENTS

CN   108764420   * 11/2018   ............. G06K 19/06
FR   2968797   * 6/2012   ............. G06K 19/06

OTHER PUBLICATIONS

Acqua, Andrea Dell; Ferrari, Marco, Marcon, Marco, Sarti, Augusto and Tubaro, Stefano; "Colored Visual Tags: a Robust Approach for Augmented Reality", Engineering Village(Compendex, Inspec, NTIS & Chimica): Technical Literature Search; Sep. 16, 2005, pp. 423-427.

*Primary Examiner* — Daniel St Cyr
(74) *Attorney, Agent, or Firm* — Thompson Hine LLP

(57) ABSTRACT

Various implementations disclosed herein include devices, systems, and methods that provide color visual markers that include colored markings that encode data, where the colors of the colored markings are determined by scanning (e.g., detecting the visual marker using a sensor of an electronic device) the visual marker itself. In some implementations, a visual marker is detected in an image of a physical environment. In some implementations, the visual marker is detected in the image by detecting a predefined shape of a first portion of the visual marker in the image. Then, a color-interpretation scheme is determined for interpreting colored markings of the visual marker that encode data by identifying a set of colors at a corresponding set of predetermined locations on the visual marker. Then, the data of the visual marker is decoded using the colored markings and the set of colors of the color-interpretation scheme.

21 Claims, 9 Drawing Sheets

(51) Int. Cl.
*G06T 7/90* (2017.01)
*G06N 20/00* (2019.01)

(58) Field of Classification Search
USPC ............... 235/462.09, 462.1, 462.15, 462.25
See application file for complete search history.

(56) References Cited

U.S. PATENT DOCUMENTS

| | | | |
|---|---|---|---|
| 8,194,914 B1 | 6/2012 | Skogg et al. | |
| 10,014,940 B2* | 7/2018 | Tay | H04B 10/1141 |
| 2009/0252371 A1* | 10/2009 | Rao | H04N 1/6052 |
| | | | 382/100 |
| 2012/0256000 A1* | 10/2012 | Cok | G06K 19/06056 |
| | | | 235/462.41 |
| 2018/0107902 A1* | 4/2018 | Yang | G06N 5/022 |
| 2018/0365495 A1* | 12/2018 | Laycock | G06V 10/40 |
| 2019/0065848 A1* | 2/2019 | Borrel | G06V 20/00 |

* cited by examiner

VISUAL MARKER WITH USER SELECTABLE APPEARANCE

CROSS-REFERENCE TO RELATED APPLICATIONS

This application claims the benefit of U.S. Provisional Application Ser. No. 62/960,796 filed Jan. 14, 2020, which is incorporated herein in its entirety.

TECHNICAL FIELD

The present disclosure generally relates to electronic devices, and in particular, to systems, methods, and devices that involve electronic devices that capture images of visual markers having a user selectable appearance.

BACKGROUND

Visual markers exist today in the form of barcodes, Quick Response (QR) codes, and other proprietary code-based systems. QR codes encode binary data such as strings or other payloads to initiate payments, link to websites, link to location-based experiences or contextual-based experiences, or launch into other web-based experiences.

SUMMARY

Various implementations disclosed herein include devices, systems, and methods that provide color visual markers that include colored markings having particular size or shape attributes that encode data, where the colors of the colored markings are used to interpret the colored markings. In some implementations, a visual marker creator chooses the colors (e.g., 2-8 colors) of the visual marker, and the visual marker will indicate which colors are the chosen colors at preset locations (e.g., 2-8 locations) on the visual marker. In some implementations, an electronic device that scans such a visual marker can interpret the visual marker by identifying the colors and using the identified colors from the visual marker itself to interpret colored markings (e.g., bars, squares, spikes) that encode data in the visual marker.

In some implementations, at a mobile electronic device having a processor, a visual marker is detected in an image of a physical environment. In some implementations, the visual marker is detected in the image by detecting a predefined shape of a first portion of the visual marker in the image. Then, a color-interpretation scheme is determined for interpreting colored markings of the visual marker that encode data. In some implementations, the color-interpretation scheme is determined by identifying a set of colors based on the visual marker. In some implementations, the set of colors is identified by looking at a set of predetermined locations on the visual marker. For example, a first color is identified based on color 1 being identified in a first particular position on the visual marker, a second color is identified based on color 2 being identified in a second particular position on the visual marker, and so on. In some implementations, the first and second particular positions are located within the shape of the first portion. Then, the data of the visual marker is decoded based on the colored markings and the set of colors of the color-interpretation scheme. In some implementations, the colored markings that encode the data are in a second different portion of the visual marker.

In some implementations, a relative positioning between the mobile electronic device and the visual marker is determined based on an orientation of the first portion of the visual marker detected in the image. In some implementations, the relative positioning determines the relative pose (e.g., position and orientation) of the visual marker with respect to the mobile electronic device. In some implementations, the relative positioning is used to rectify the appearance of the visual marker in detected in the image.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
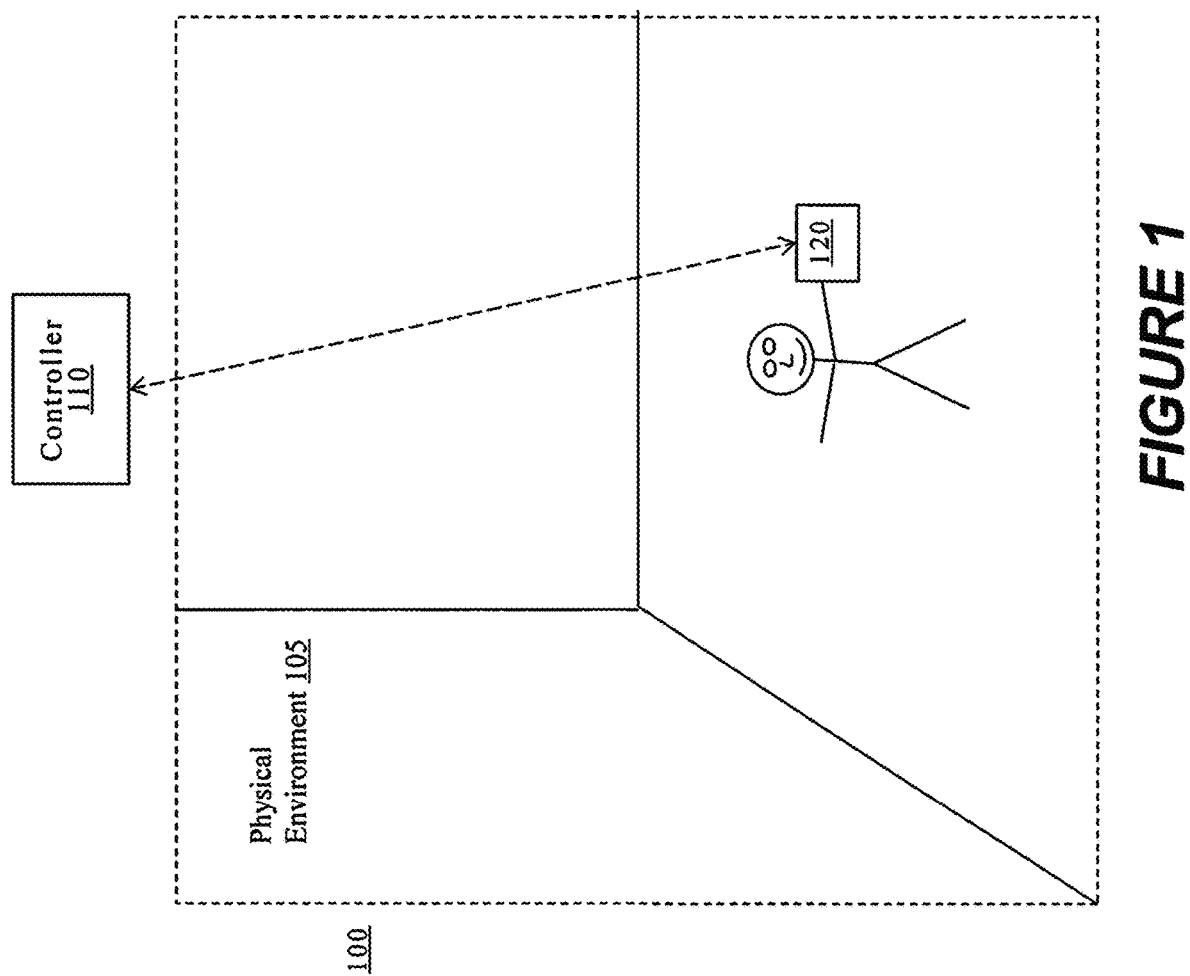
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
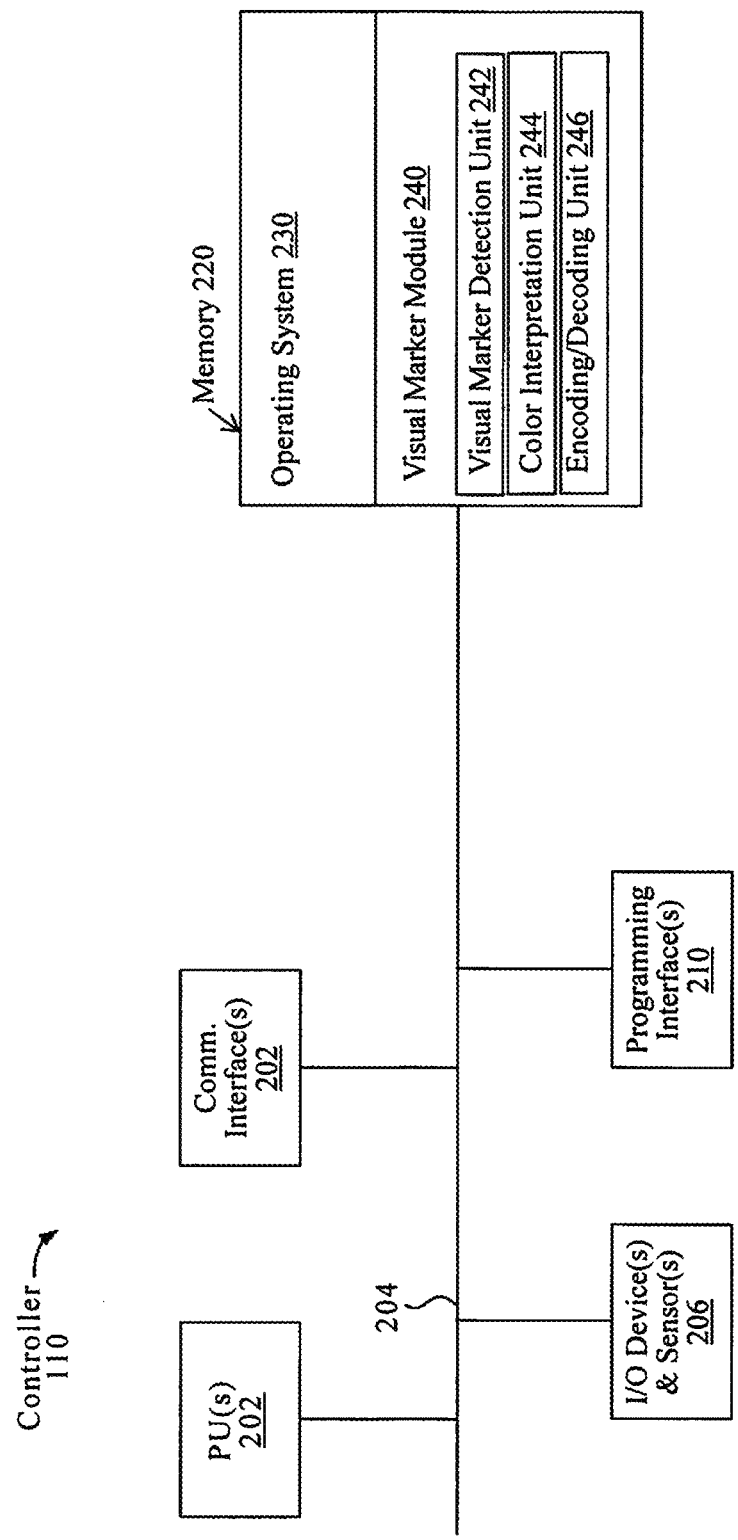
FIG. 2 is a block diagram of an example controller in accordance with some implementations.
Figure 3:
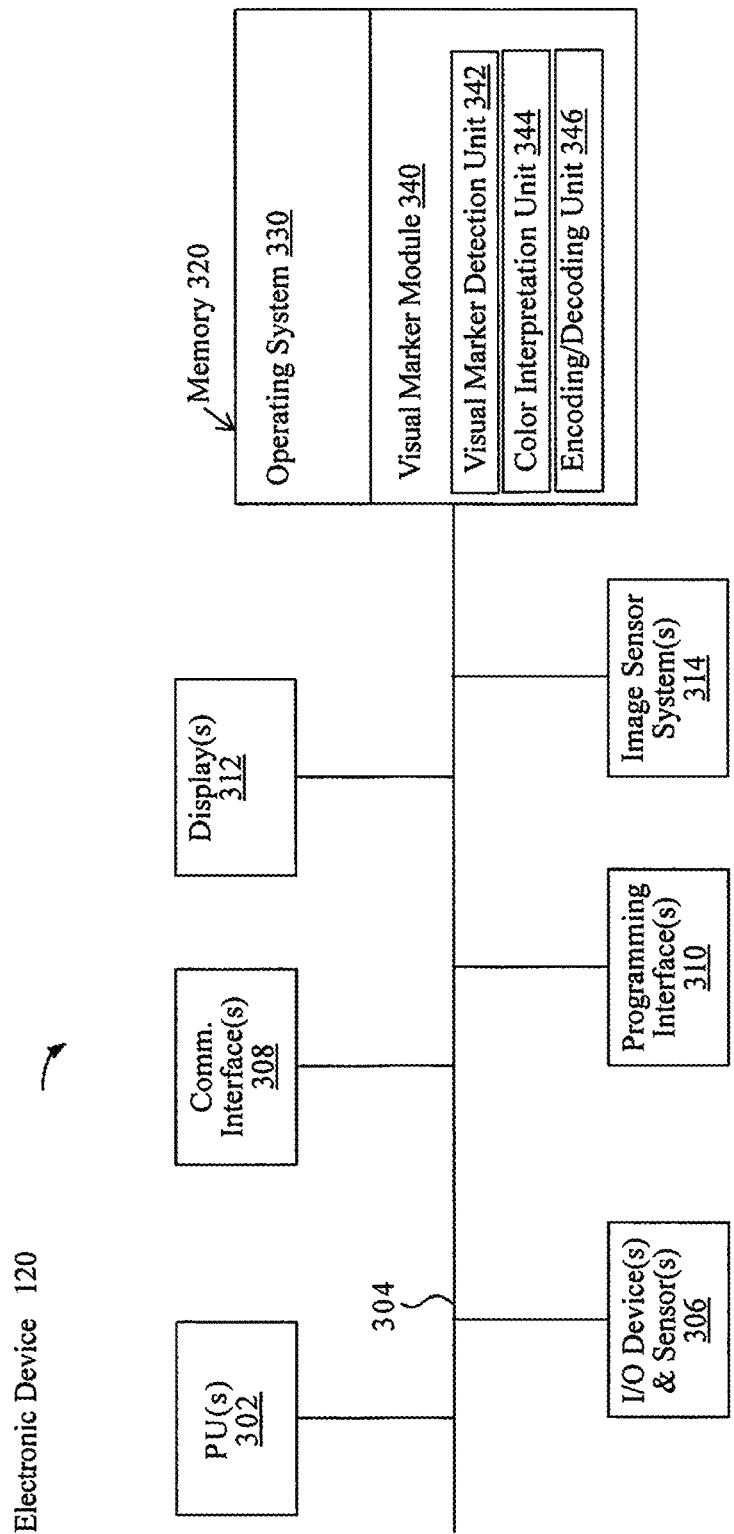
FIG. 3 is a block diagram of an example electronic in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving a hand-held mobile electronic device, other implementations may involve other types of devices including, but not limited to, watches and other wearable electronic devices, mobile devices, laptops, desktops, gaming devices, head mounted devices (HMDs), home automation devices, and other devices that include or use image capture devices.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120, one or both of which may be in a physical environment. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, the controller 110 is configured to detect and use visual markers or to manage and coordinate a computer-generated reality (CGR) environment for the user. In some implementations, the controller 110 includes a suitable combination of software, firmware, or hardware. The controller 110 is described in greater detail below with respect to FIG. 2. In some implementations, the controller 110 is a computing device that is local or remote relative to the physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.).

In some implementations, the controller 110 and the electronic device 120 are configured to detect and use visual markers or to present the CGR environment to the user together.

In some implementations, the electronic device 120 is configured to detect and use visual markers or to present the CGR environment to the user. In some implementations, the electronic device 120 includes a suitable combination of software, firmware, or hardware. The electronic device 120 is described in greater detail below with respect to FIG. 3. In some implementations, the functionalities of the controller 110 are provided by or combined with the electronic device 120, for example, in the case of an electronic device that functions as a stand-alone unit.

According to some implementations, the electronic device 120 presents a CGR environment to the user while the user is present within the physical environment 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a visual marker module 240.

The operating system 230 includes procedures for handling various basic system services and for performing hardware dependent tasks.

In some implementations, the visual marker module 240 is configured to identify, share, or manage visual marker information. In some implementations, the visual marker module 240 includes a visual marker detection unit 242, a color interpretation unit 244, and an encoding/decoding unit 246. The visual marker detection unit 242 is configured to detect and rectify visual markers in images of a physical environment. The color interpretation unit 244 is configured to provide/interpret color schemes of the visual marker. The encoding/decoding unit 246 is configured to encode/decode colored markings encoding data for the visual marker.

The visual marker module 240 may be implemented as part of a CGR application that is configured to present virtual content (e.g., 3D content) that will be used as part of CGR environments for one or more users. For example, the user may view and otherwise experience a CGR-based user interface that allows the user to select, place, move, and otherwise experience a CGR environment based at least in part on detection and use of a visual marker, for example, via hand gestures, voice commands, input device inputs, etc.

Although these modules and units are shown as residing on a single device (e.g., the controller 110), it should be understood that in other implementations, any combination of these modules and units may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present a CGR environment to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user.

The memory 320 includes high-speed random-access memory, such as DRAM, CGRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a visual marker module 340.

The operating system 330 includes procedures for handling various basic system services and for performing hardware dependent tasks.

In some implementations, the visual marker module 340 is configured to identify, share, or manage visual marker information. In some implementations, the visual marker module 340 includes a visual marker detection unit 342, a color interpretation unit 344, and an encoding/decoding unit 346. The visual marker detection unit 342 is configured to detect and rectify visual markers in images of a physical environment. The color interpretation unit 344 is configured to provide/interpret color schemes of the visual marker. The encoding/decoding unit 346 is configured to encode/decode colored markings encoding data for the visual marker.

The visual marker module 340 may be implemented as part of a CGR application that is configured to present virtual content (e.g., 3D content) that will be used as part of CGR environments for one or more users. For example, the user may view and otherwise experience a CGR-based user interface that allows the user to select, place, move, and otherwise experience a CGR environment based at least in part on detection and use of a visual marker, for example, via hand gestures, voice commands, input device inputs, etc.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 4:
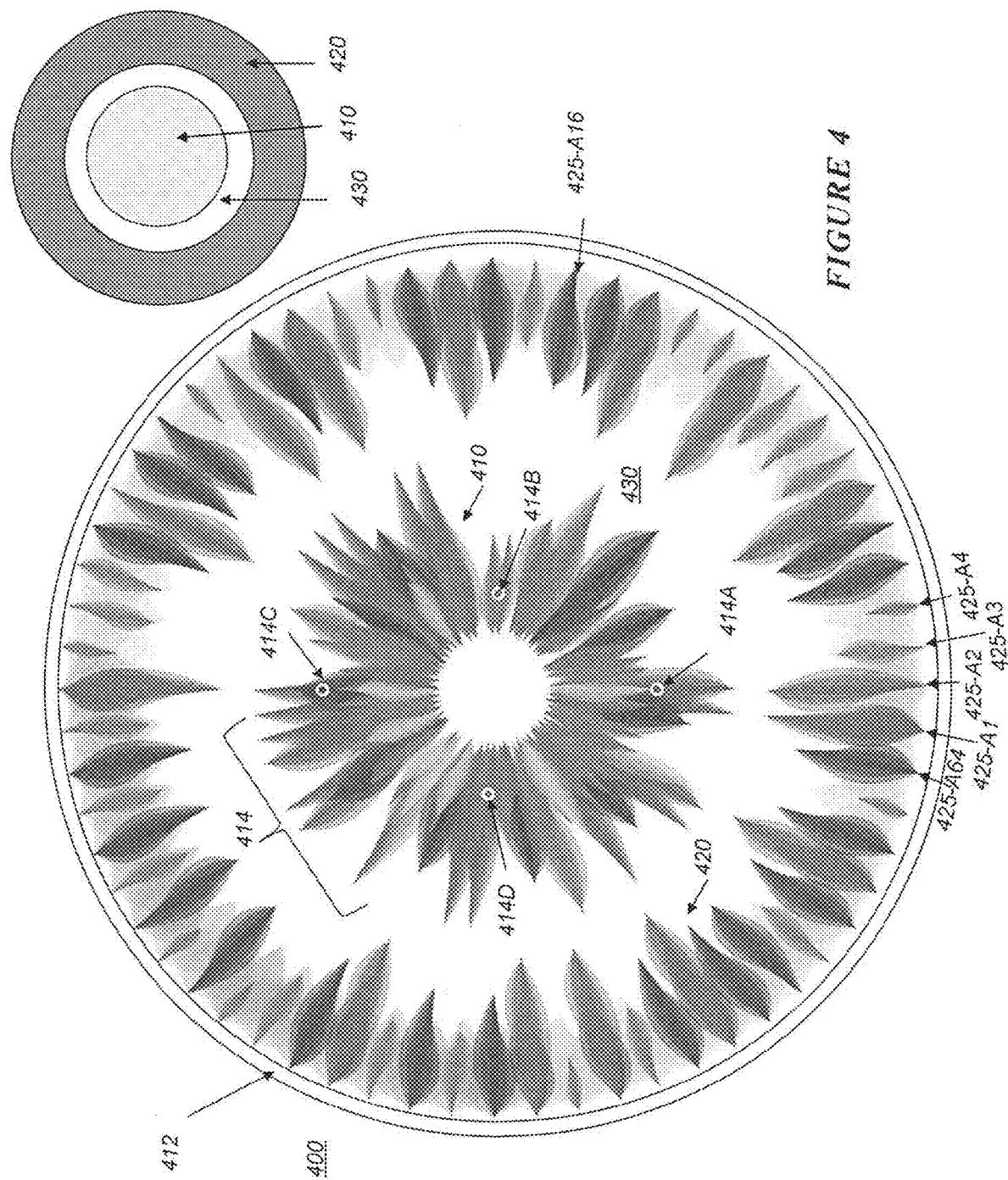
FIG. 4 is a diagram illustrating an exemplary visual marker with user selectable appearance in accordance with some implementations.

FIG. 4 is a diagram illustrating an exemplary visual marker with user selectable appearance in accordance with some implementations. As shown in FIG. 4, a visual marker 400 includes a first portion 410 for detection, a second portion 414 to identify colors used in the visual marker 400, and a third portion 420 to encode data in the visual marker 400. In various implementations, the colors used in the visual marker 400 can be any colors, for example, any selection of a set of user-selected colors selected when the user creates the visual marker.

As shown in FIG. 4, the first portion 410 includes a preset shape for detection. In some implementations, the first portion 410 has a preset shape that is used for detection and rectification. In some implementations, the first portion 410 is an inner area having a predefined shape that is consistent for multiple different visual markers, e.g., visual markers that encode different data. As shown in FIG. 4, the first portion 410 is an inner ring having a specific overall predefined shape. In some implementations, the predefined shape of the first portion 410 is an arrangement of a pre-defined number of protrusions using a single or a set of predefined shapes. As shown in FIG. 4, the first portion 410 is an arrangement of shapes from the third portion 420 forming the specific overall predefined shape. In some implementations, the predefined shape of the first portion 410 enables detection, rectification, and determination of orientation of visual marker 400. The predefined shape may be asymmetric to reflection and thus may be used to detect whether the visual marker 400 is captured in a reflection, which may be accounted for (e.g., corrected for in determining the location of the visual marker 400). In some implementations, colors of the first portion 410 are variable (e.g., different for different visual markers), and accordingly, the detection of the visual marker 400 using the first portion 410 is shaped-based and does not use color. In some implementations, the detection of the visual marker 400 in an image can be accomplished using computer vision techniques.

As shown in FIG. 4, the second portion 414 includes elements that make up the first portion 410. In other implementations, the first and second portions are distinct and separate. In other implementations, the second portion 414 includes elements that make up the third portion 420. The second portion 414 identifies the colors used in the visual marker 400. In some implementations, the visual marker 400 uses a plurality of different colors (e.g., 2, 3, 4, 8, etc.). In some implementations, the second portion 414 includes known locations or positions in the first portion 410 that are each colored with one of the colors used in the visual marker 400. As shown in FIG. 4, the second portion 414 includes 4 locations 414A, 414B, 414C, and 414D in the first portion 410 that are each respectively colored with one of the 4 colors used in the visual marker 400. In some implementations, the second portion 414 includes a plurality of pixels at each of the 4 known locations 414A, 414B, 414C, and 414D. In some implementations, the second portion 414 is a prescribed shape (e.g., square, triangle, ellipse, etc.) formed from a plurality of pixels for the known locations 414A, 414B, 414C, and 414D. In some implementations, the second portion 414 includes shapes that are similar or identical to those from the third portion 420 and the 4 known locations (e.g., 414A, 414B, 414C, and 414D) are located at one of these shapes of the second portion 414 colored with one of the 4 colors of the visual marker 400. In some implementations, the second portion 414 uses known locations based on the specific overall predefined shape of the first portion 410. In some implementations, the second portion 414 uses known locations (e.g., not within the first portion or the third portion 420) based on the specific overall shape of the visual marker 400.

In some implementations, the second portion 414 (e.g., 414A, 414B, 414C, and 414D) allow the data in the third portion 420 to be decoded correctly. For example, a particular visual marker 400x has color 1 at location 414A, color 2 at location 414B, color 3 at location 414C, and color 4 at location 414D to encode data in a corresponding third portion 420. In this example, if color 1 was interpreted as 414B, color 2 was interpreted as 414C, color 3 was interpreted as 414D, and color 4 was interpreted as 414A, the data in the third portion in this particular visual marker 400x would be incorrectly decoded.

In some implementations, the second portion 414 uses known locations based on the specific overall shape and orientation of the visual marker 400. In various implementations, the colors of the visual marker 400 are not predefined (e.g., the set of colors used for a given visual marker that encodes a first data item may be different from the set of colors used for another visual marker that encodes a second data item). In various implementations, the colors of the visual marker 400 can be selected in any manner when a visual marker is designed, created, or modified. In various implementations, the colors of the visual marker 400 are identified by the visual marker 400 and can be any colors.

In some implementations, the third portion 420 encodes the data of the visual marker 400 using color. As shown in FIG. 4, the third portion 420 encodes the data of the visual marker 400 using shape and color. In some implementations, the third portion 420 is an outer area of colored shapes. In some implementations, the third portion 420 is an outer ordered sequence of colored shapes. In FIG. 4, the third portion 420 includes 64 colored shapes 425-A1, 425-A2, . . . , 425-A64 sequentially ordered clockwise or counterclockwise from a starting position. As shown in FIG. 4, the third portion 420 includes colored shapes 425 that include combinations of 4 shapes, 4 colors, and 2 orientations (e.g., tapering radially inward or tapering radially outward). In some implementations, the third portion 420 encodes the data of the visual marker 400 using a combination of a number, a length, a thickness, an orientation, or a color of the colored shapes 425. In some implementations, the third portion 420 is adjacent or inside (e.g., an inner portion of the visual marker 400) the first portion 410.

In some implementations, the third portion 420 is separated from the first portion 410 by a gap 430. In some implementations, the gap 430 does not include any colored shapes. In some implementations, the gap 430 is a single color. In some implementations, the gap 430 is one or more colors that are not used in the first portion 410 or the third portion 420. In some implementations, the gap 430 is a sufficient size to visually separate the first portion 410 from the third portion 420. In some implementations, the gap 430 is a gap having a predetermined minimum size. In some implementations, the gap 430 is a white gap at least 2 pixels wide as seen by an image sensor on an electronic device.

In some implementations, the visual marker 400 further includes a detection zone 412 for detection. In some implementations, the third portion 420 includes the detection zone 412. In some implementations, the first portion 410 includes the detection zone 412. In some implementations, the detection zone 412 does not include any shapes. In some implementations, the detection zone 412 includes additional pre-defined shapes (e.g., squares, hearts, etc.) for detection. In some implementations, the detection zone 412 is a single color. In some implementations, the detection zone 412 uses one or more colors that are not used elsewhere in the visual marker 400. In some implementations, the detection zone 412 is an outermost area having predefined shape or a predefined ratio of dimensions (e.g., thickness to diameter). In some implementations, the detection zone 412 is a ring having predefined shape or a predefined ratio of thickness to diameter. In some implementations, the detection zone 412 is a white ring at least 2 pixels wide as seen by an image sensor on an electronic device. In some implementations, the detection zone 412 is at least a portion of the gap 430. In some implementations, the detection of the visual marker 400 in an image can be accomplished using machine learning (ML) to detect the detection zone 412.

In some implementations, the first portion 410 and the second portion 420 are variously spatially separated in the visual marker 400. In some implementations, the first portion 410, the second portion 414, and the third portion 420 are variously spatially separated in the visual marker 400. In some implementations, the first portion 410, the gap 430, the second portion 420, and the detection zone 412 are variously spatially separated in the visual marker 400. As shown in FIG. 4, the first portion 410, the gap 430, the third portion 420 and the detection zone 412 are radially separated.

As shown in FIG. 4, the visual marker 400 is generally in the shape of a circle. However, implementations of the visual marker 400 are not intended to be so limited. In some implementations, other shapes of the visual marker 400 can be used. In some implementations, the visual marker 400 is an asymmetric shape, a symmetric shape, an ellipse, a rectangle, a triangle, a bow tie, or the like. In various implementations, the visual marker 400 includes the first portion 410, the second portion 414, the third portion 420, and at least a portion of the gap 430.

In some implementations, the first portion 410 of the visual marker 400 can encode a version. In some implementations, there can be a plurality of different versions of the visual marker 400. For example, there can be 10 different versions of the visual marker 400. In some implementations, the version is encoded in the shape of the first portion 410. In some implementations upon detection of the shape of the first portion 410, version of the visual marker 400 is known. In some implementations upon detection of the shape of the first portion 410, the location of second portion 414 and the third portion 420 are known. In one example implementation of the visual marker 400, there are 3 different versions where a first version includes 3 locations for three colors in the second portion 414 and 16 colored shapes with two lengths in the third portion 420. The second version includes 8 locations for eight colors in the second portion 414 and 64 colored shapes with 4 different lengths, 3 thicknesses, and a radial orientation of the shape for each colored marking in the third portion 420. The third version includes 4 locations for four colors in the second portion 414 and 32 colored shapes with two lengths and 2 thickness in the third portion 420. In some implementations, each different version of the visual marker 400 is encoded by using a different shape of the first portion 410. In some implementations, the version is encoded in the shape of a portion of the visual marker 400 that is not the first portion 410.

In some implementations, an additional portion of the visual marker 400 may be colored using a single color (e.g., white or grey). In some implementations, the additional portion of the visual marker 400 may be colored using a single color that is not used in the first portion 410 or the third portion 430. In some implementations, the additional portion of the visual marker 400 is at least one of a region of the visual marker 400 adjacent at least a part of the first portion 410 (e.g., a central area) or adjacent at least a part of the third portion 430. In some implementations, the additional portion of the visual marker 400 includes the gap 430 or the detection zone 412. In some implementations, the additional portion of the visual marker 400 is used to perform local white balancing of colors in the visual marker 400 upon detection by an image sensor. In some implementations, the additional portion of the visual marker 400 is used to detect spatially varying illumination at the detected visual marker or correct for any detected spatially varying illumination. For example, when there is a shadow detected in the additional region that is both a central region of the visual marker 400 and a region outside the third portion 430 (e.g., across part of the visual marker 400), the detected shadow in the additional region can be used to correct for the color changes in the visual marker 400 (e.g., first portion 410, third portion 430) caused by the shadow. In some implementations, the spatially varying illumination at a detected visual marker is caused by a light source, uneven lighting, objects in the physical environment, or the like.

Figure 5:
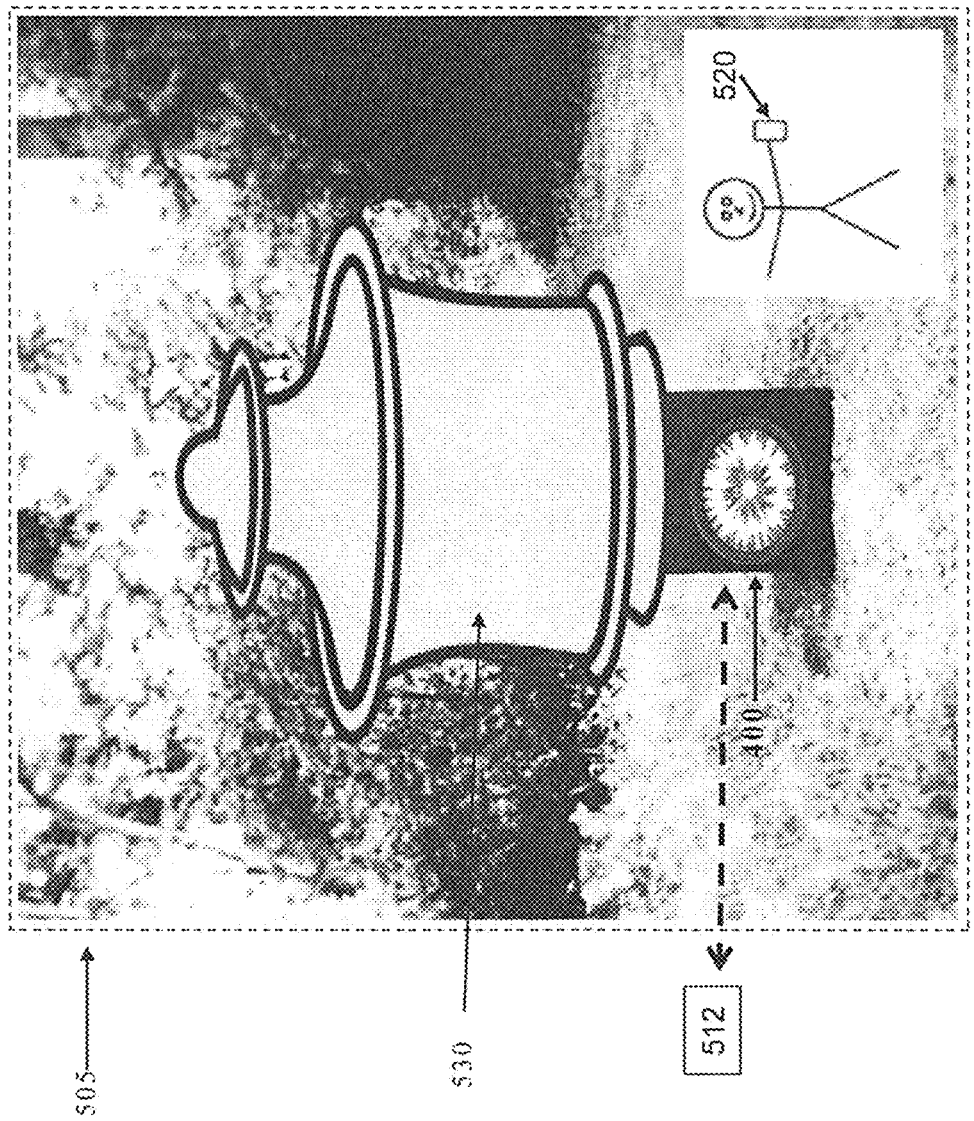
FIG. 5 is a diagram illustrating a visual marker detectable by an electronic device in a physical environment in accordance with some implementations.

FIG. 5 is a diagram illustrating a visual marker detectable by an electronic device in a physical environment in accordance with some implementations. As shown in FIG. 5, a visual marker can be the visual marker 400 positioned at a known geolocation and is mounted on a statue 530 in a physical environment 505. In FIG. 5, the physical environment 505 is a park. In some implementations, the electronic device 520 is a mobile electronic device.

As shown in FIG. 5, in some implementations the electronic device 520 detects the visual marker 400 in an image of the physical environment 505. In some implementations, the electronic device 520 detects the visual marker 400 in a plurality of images of the physical environment 505. In some implementations, the image(s) is a 2D image or 3D image at the electronic device 520.

Figure 6:
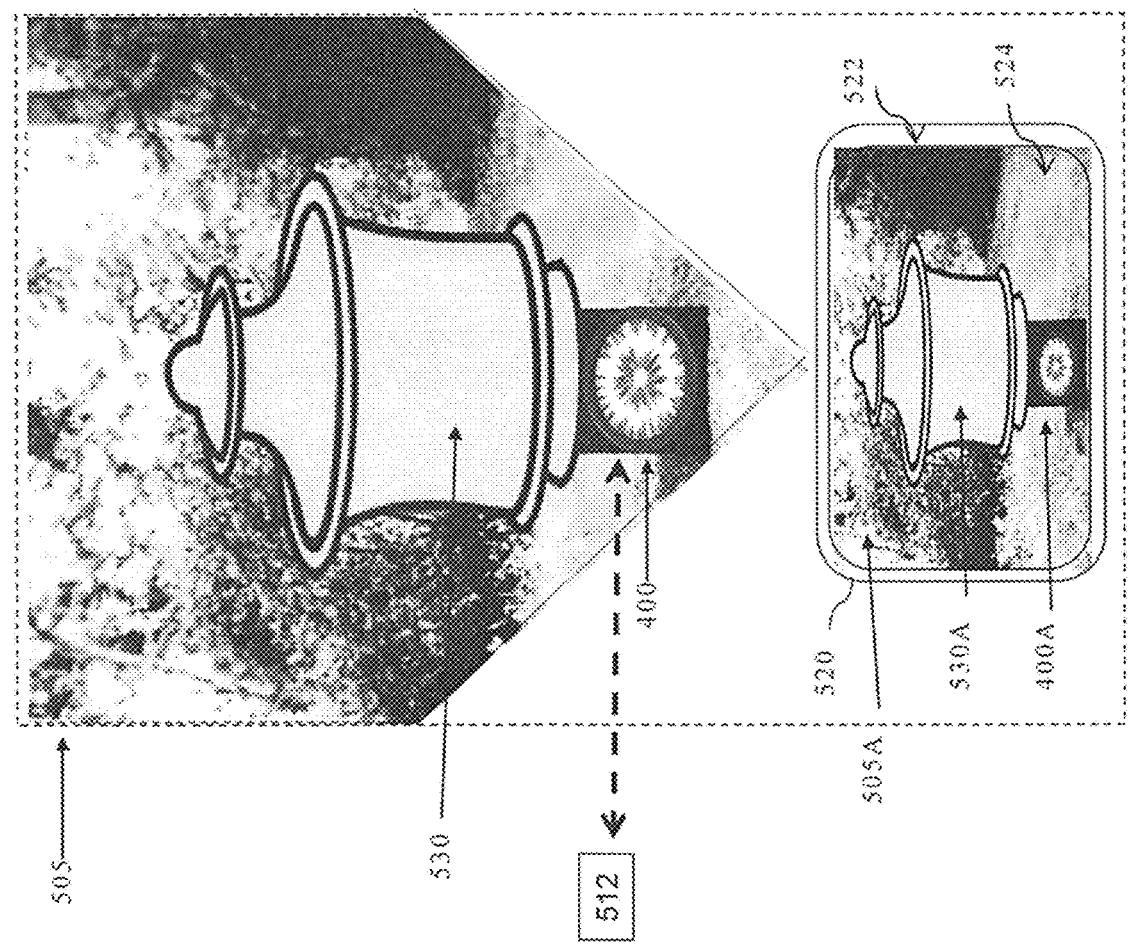
FIG. 6 is a diagram illustrating a depiction at an electronic device of the visual marker of FIG. 4 in accordance with some implementations.

In some implementations, real world items exist in the physical environment 505 and can be viewed using the electronic device 520. As shown in FIG. 6, the visual marker 400A and a statue 530A are concurrent real-time representations in a CGR environment 505A of the visual marker 400 and the statue 530 in the physical environment 505. In FIG. 6, the CGR environment 505A is shown using image 524 at a display 522 of the electronic device 520.

In various implementations, the visual markers 400 are 2D objects that encode binary data such as strings or other payloads used to access remotely-based experiences 512. In some implementations, the links to the remotely-based experiences 512 include links to initiate payments (e.g., sanctioned payment endpoints), links to websites (e.g., URLs), or links that launch into web-based experiences. In some implementations, the visual markers 400 are used to launch only into or link only to sanctioned remotely-based experiences 512 authorized by the creator of the visual marker 400.

As shown in FIG. 5 and FIG. 6, the electronic device 520 can detect a visual marker such as the visual marker 400 based on the image or images (e.g., the CGR environment 505A) of the physical environment 505 including the visual marker 400.

In some implementations, detecting a visual marker is a 2-step process where a first analysis classifies an image as containing the visual marker or not and a second analysis evaluates images classified as containing the visual marker. In some implementations, the first analysis detects the detection zone 412. In some implementations, the second analysis performs shape detection for the first portion 410. In some implementations, the first analysis and the second analysis can be performed using ML. ML methods for object detection include machine learning-based approaches or deep learning-based approaches. In some implementations, machine learning approaches first define features from a set of data that contains both the inputs and the desired outputs, then uses a classification technique to identify an object. In some implementations, deep learning techniques do end-to-end object detection without specifically defining features, for example, using convolutional neural networks (CNN).

In some implementations, the first analysis of an image (e.g., the image 524) uses a first neural network (NN) trained to classify the image as containing the visual marker (e.g., visual marker 400) or not containing the visual marker by searching the image for the detection zone 412. In some implementations, the second analysis of the image (e.g., the image 524) uses a second NN trained to detect the visual marker (e.g., visual marker 400) when the output of the first NN is positive. In some implementations, the second NN finds the visual marker 400 by detecting the first portion 410 in the image 524. In some implementations, the second NN is trained by rendering the pre-defined shape(s) (e.g., the first portion 410) in specific orientations in space and in front of arbitrary backgrounds using millions of images. In some implementations, the second NN is trained for color invariant shape detection of the first portion 410 by rendering the pre-defined shapes in the training images with varying colors.

In some implementations, detection of the detection zone 412 is a computationally less expensive computer vision task than detection of the first portion 410 in an image.

In some implementations once the visual marker 400 is detected in the image 524, the visual marker 400 is rectified based on the image 524. In some implementations, rectifying the visual marker 400 transforms or warps a shape of the visual marker image to make the rectified visual marker appear flat if viewed from directly overhead (e.g., orthogonal to a center of the visual marker). In some implementations, rectifying the visual marker image determines the position and orientation of the electronic device 520 (e.g., a sensor such as a camera thereof) with respect to the visual marker 400 in the physical environment 505 using the image 524 (e.g., may determine distance and/or direction from electronic device 520 to the visual marker 400 using computer vision processing like RGB-D; SLAM; stereo or disparity-based estimation). In some implementations, rectifying the visual marker image determines the relative orientation of the visual marker 400 with respect to the mobile electronic device 520.

In some implementations, after the visual marker 400 is rectified, the visual marker 400 can be oriented (e.g., top-to-bottom and left-to-right) using the shape of the first portion 410.

In some implementations after the detected visual marker 400 is rectified, a first portion of the visual marker 400 can be used to determine a version of the visual marker. In some implementations, the version(s) of the visual marker 400 varies a number of colors (e.g., the second portion 414) and varies shape encoded data (e.g., the third portion 420). In some implementations, the version(s) of the visual marker 400 is encoded in at least a predefined shape of a portion of the visual marker (e.g., the shape of the first portion 410).

In some implementations after the version of the detected visual marker is identified, a second portion of the visual marker is decoded to determine a plurality of colors that can be any color used in the visual marker. In some implementations, the version identifies preset locations (e.g., 8 locations) for the plurality of colors that can be any color in the visual marker. In one implementation, when 8 preset locations for the plurality of colors in the visual marker are identified by the version and less than 8 colors are actually used in the visual marker, duplicate colors are provided at more than 1 of the 8 preset locations. For example, when 8 preset locations for the plurality of colors are identified by the version and 3 colors are actually used in the visual marker, a first color and a second color are each provided at 3 preset locations and a third color is provided at 2 preset locations. In this example, the multiple examples of the 3 colors can be combined (e.g., averaged) to determine the 3 colors used to decode the visual marker.

In some implementations after the plurality of colors used in the visual marker are identified, the visual marker 400 is decoded by decoding data encoded in a plurality of prescribed colored markings in at least a third portion of the visual marker (e.g., the third portion 420). In some implementations, the plurality of prescribed colored markings are parameterized by shape or color. In some implementations, parameterization by shapes in the plurality of prescribed colored markings include length, width, boundary shape, orientation (e.g., upside right or upside down). In some implementations, the plurality of prescribed colored shapes are parameterized by shape or color based on the version of the visual marker.

In some implementations, color encoded data and shape encoded data are decoded using different decoding techniques. In some implementations, color encoded data and shape encoded data in the visual marker 400 are decoded using different decoding techniques that take different amounts of time or have different levels of accuracy. In some implementations, selected data for the visual marker 400 is encoded using color encoded data or shape encoded data based on a priority of the selected data. In some implementations, color encoded data and shape encoded data are at least partially redundant. In some implementations, color encoded data and shape encoded data are redundant.

In some implementations, the plurality of colors used in the visual marker 400 can be any set of colors. In some implementations, the plurality of colors used in the visual marker 400 are selected in real time as an image is captured based on colors at a location in a physical environment. In some implementations, the plurality of colors used in the visual marker 400 are selected based on an input image. In some implementations, the plurality of colors used in the visual marker 400 are selected by the visual marker designer.

As shown in FIGS. 5-6, in some implementations the image of the physical environment 505 is obtained using a sensor (e.g., camera) on the electronic device 520. In some implementations, the sensor can be a RGB camera, stereo cameras, a depth sensor (e.g., time of flight, structured light), a RGB-D camera, one or more 2D cameras, IR cameras, event cameras, or the like. In some implementations, color images can be used. Alternatively, in some implementations, grayscale images can be used.

FIGS. 5-6 illustrates electronic devices 520. The electronic devices 520 can include some or all the features of one or both of the controller 110 and the electronic device 120.

Figure 7:
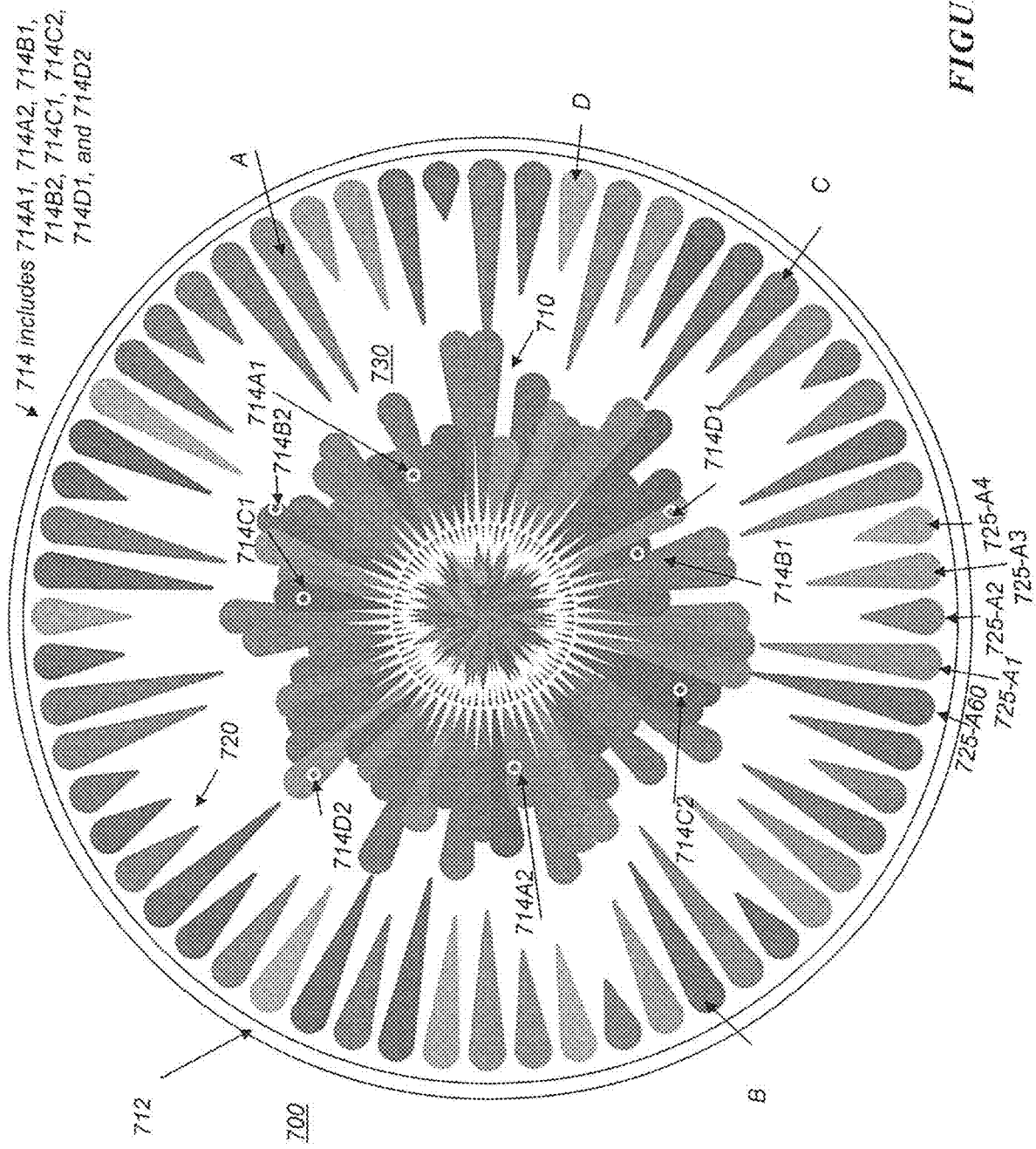
FIG. 7 is a diagram illustrating an exemplary visual marker with user selectable appearance in accordance with some implementations.

FIG. 7 is a diagram illustrating another exemplary visual marker with user selectable appearance in accordance with some implementations. As shown in FIG. 7, a visual marker 700 includes a first portion 710 for detection, a second portion 714 to identify the colors used in the visual marker 700, and a third portion 720 to encode data in the visual marker 700.

As shown in FIG. 7, the first portion 710 includes a standard shape for detection and rectification. In some implementations, the first portion 710 is an inner ring having a specific predefined shape. In some implementations, colors of the first portion 710 are variable, and accordingly, the detection of the visual marker 700 may be shaped-based and does not use color. In some implementations, the detection of the visual marker 700 in an image can be accomplished using ML.

In some implementations, the second portion 714 identifies the colors used in the visual marker 700. As shown in FIG. 7, the visual marker 700 uses a plurality of 4 different colors (color A, color B, color C, and color D). In some implementations, the second portion 714 includes known locations or positions in the first portion 710 that are each colored with one of the 4 colors used in the visual marker 700. As shown in FIG. 7, the second portion 714 includes 8 locations 714A1, 714A2, 714B1, 714B2, 714C1, 714C2, 714D1, and 714D2 that are each colored with one of the 4 colors used in the visual marker 700. In some implementations, the second portion 714 uses spokes in the first portion 710 and known locations (e.g., 714A1, 714D2) on the spokes are each colored with one of the four colors of the visual marker 700. In some implementations, the second portion 714 is included in the standard shape of the first portion 710. In various implementations, the colors of the visual marker 700 are not pre-defined. In various implementations, the colors of the visual marker 700 can be selected in any manner.

As shown in FIG. 7, the third portion 720 encodes the data of the visual marker 700 using shape and color. In some implementations, the third portion 720 is an outer ring of colored shapes. In FIG. 7, the third portion 720 includes 60 colored shapes 725-A1, 725-A2, . . . , 725-A60 sequentially ordered clockwise or counterclockwise from a starting position. In some implementations, the third portion 720 encodes the data of the visual marker 700 using a number, a length, a thickness, or a color of colored shapes 725 in the outer ring. As shown in FIG. 7, the 60 colored shapes 725-A1, 725-A2, . . . , 725-A60 are each one of 8 different lengths. In this example, the amount of data that can be encoded in visual marker 700 is 300 bits because each of the 60 colored shapes has 32 different possible values, which could encode 5 bits at each colored shape (e.g., 2 bits for color and 3 bits for shape).

In some implementations, the third portion 720 is separated from the first portion 710 by a gap 730. In some implementations, the gap 730 does not include any colored shapes. In some implementations, the gap 730 is a single color that is not used in the first portion 710 or the third portion 720.

In some implementations, the first portion 710 further includes a detection zone 712 that does not include any shapes. In some implementations, the detection zone 712 is a single color. In some implementations, the detection zone 412 is a one or more colors that is not used elsewhere in the visual marker 400. In some implementations, the detection zone 412 is a predefined shape or a predefined ratio of thickness to diameter. In some implementations, the detection zone 412 is a white ring at least 2 pixels wide as seen by an image sensor on an electronic device.

Figure 8:
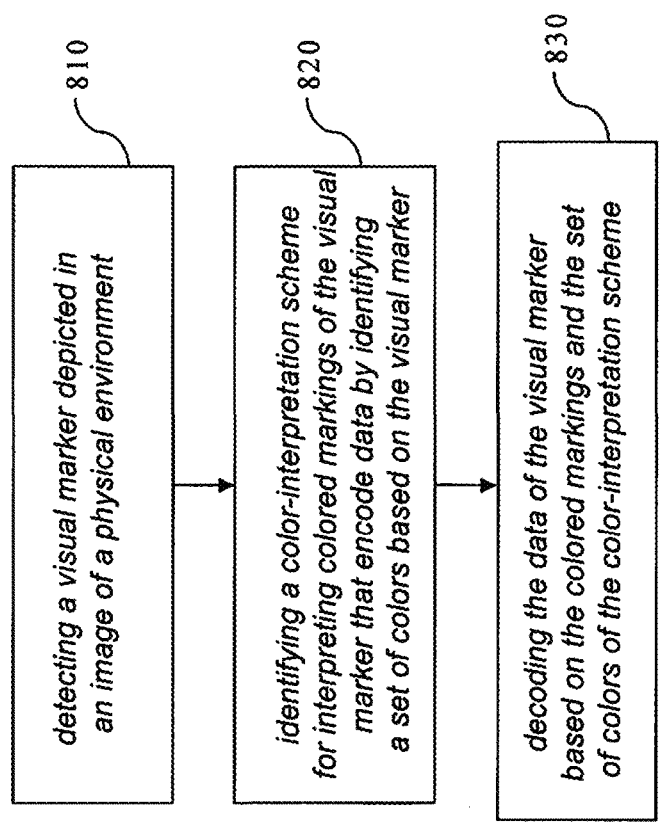
FIG. 8 is a flowchart illustrating an exemplary method of interpreting a colored visual marker that encodes data using shape or color in accordance with some implementations.

FIG. 8 is a flowchart illustrating an exemplary method of interpreting a colored visual marker that encodes data using shape or color in accordance with some implementations. In some implementations, the method 800 is performed by a device (e.g., controller 100 or electronic device 120 of FIGS. 1-3). The method 800 can be performed using an electronic device or by multiple devices in communication with one another. In some implementations, the method 800 is performed by processing logic, including hardware, firmware, software, or a combination thereof. In some implementations, the method 800 is performed by a processor executing code stored in a non-transitory computer-readable medium (e.g., a memory).

At block 810, the method 800 detects a visual marker in an image of a physical environment. In some implementations, the visual marker is detected in a 2D image or 3D image of a mobile electronic device. In some implementations, the visual marker is detected by finding a pre-determined shape of a portion of the visual marker. In some implementations, a selected portion such as an inner ring of the visual marker that has a pre-determined shape is detected in the image.

At block 820, the method 800 identifies a color-interpretation scheme for interpreting colored markings of the visual marker that encode data. In some implementations, identifying the color-interpretation scheme includes identifying a set of colors based on the visual marker. In one implementation, the set of colors has 3 colors and a first color of the set of colors is identified based on that first color being in a first particular position on the detected visual marker. Similarly, a second color of the set of colors is identified based on that second color being in a second particular position on the detected visual marker, and the third color of the set of colors is identified based on that third color being in a third particular position on the detected visual marker.

At block 830, the method 800 decodes the data of the visual marker based on the colored markings and the set of colors of the color-interpretation scheme. In some implementations, the visual marker includes a sequence of colored markings. In some implementations, the visual marker includes a sequence of colored markings in a preset location on the visual marker. In some implementations, the visual marker includes a sequence of colored markings in an outer ring of the visual marker. In some implementations, the colored markings of the visual marker are parameterized by size, shape or color. In some implementations, the colored markings of the visual marker each encode 1 bit, 2 bits, 4 bits or more of data in the visual marker.

For example in one implementation, 10 colored markings are used in the visual marker that each have the same shape, the same size, and 2 colors (e.g., Tan and Pink) are used. The series of colored markings in the visual marker is T1, P1, T, T2, P3, P2, P4, T3, P, P4 where T represents a tan colored marking that is to be interpreted as a value of 0, P represents a pink colored marking that is to be interpreted as a value of 1, and where Ti and Pi (i-1, 1, 2, 3, 4) are alternate colors close to the set of 2 colors of the color-interpretation scheme. Then, the data encoded in the visual marker can be 0100111011.

In one implementation at block 810, the method 800 detects a second visual marker in an image of a physical environment. In this example implementation at block 820, the method 800 identifies a second color-interpretation scheme by identifying a second set of colors for interpreting second colored markings of the second visual marker that encode second data. In this example implementation at block 830, the method 800 decodes the data of the second visual marker based on the second colored markings and the second set of colors of the second color-interpretation scheme, where the second set of colors is different than the first set of colors.

In some implementations, at block 810, the method 800 determines a relative positioning between the mobile electronic device and the visual marker based on the image or images. In some implementations, the relative positioning determines the relative orientation of the visual marker with respect to the mobile electronic device. In some implementations, the relative positioning is determined using computer vision techniques (e.g., VIO or SLAM) or PNP techniques. In some implementations, relative positioning is determined based on stereo image processing (e.g., disparity-based estimation). In some implementations, the relative positioning determines distance or direction from the mobile electronic device to the visual marker. In some implementations, the relative positioning determines the pose (e.g., position and orientation) of the detected visual marker relative to the pose of the mobile electronic device.

In some implementations, the relative positioning is determined at the mobile electronic device by identifying the size or scale of the detected visual marker in the captured image. In some implementations, a distance between the mobile electronic device and the detected visual marker can be determined based on the size of the visual marker. In some implementations, the size or shape of visual marker can be encoded in the visual marker and then directly decoded from the image of the physical environment. In some implementations, the size or shape (e.g., parametric description) of visual marker can be provided by a remote location service accessible via the visual marker. In some implementations, the size or shape of visual marker is preset and known by the mobile electronic device. In some implementations, the size or shape of visual marker is determined using VIO, SLAM, RGB-D image processing or the like at the mobile electronic device.

Alternatively, the distance between the mobile electronic device and the detected visual marker can be determined based on a depth sensor at the mobile electronic device a detecting the visual marker in the physical environment. In some implementations, the depth sensor at the mobile electronic device uses stereo-based depth estimation. In some implementations, the depth sensor at the mobile electronic device is a depth-only sensor (e.g., time of flight, structured light).

In some implementations, the relative positioning determines a direction from the mobile electronic device to the detected visual marker in the captured image of the physical environment including the visual marker. In some implementations, once the size or shape of the visual marker is determined, the four corners (e.g., of a square or rectangular visual marker) or circumference (e.g., of a circular visual marker) can be identified in the image. In some implementations, identifying or correcting a distortion between an actual shape of the visual marker and the detected shape of the visual marker in the image determines a direction between the mobile electronic device and the detected visual marker in the physical environment.

In some implementations, the relative positioning determines the distance and direction (e.g., offset) between the mobile electronic device and the detected visual marker using VIO, SLAM or the like at the mobile electronic device.

In some implementations, at block 810, the method 800 rectifies the visual marker based on the image. In some implementations, rectification warps the visual marker from the image to make the visual marker appear flat when viewed from directly overhead orientation. In some implementations, the rectification uses the relative positioning between the mobile electronic device and the visual marker determined from the image using one or more sensors of the mobile electronic device.

In some implementations at block 810, the image of the physical environment is obtained using a sensor (e.g., camera) on the mobile electronic device (e.g., HMD) having a processor. In some implementations, the image is a 2D image or a 3D image. In some implementations, the sensor can be a RGB camera, a depth sensor, a RGB-D camera, one or more 2D cameras, IR cameras, or the like. In some implementations, combinations of sensors are used. In some implementations, the sensor is used to generate a CGR environment representing the physical environment. In some implementations, the CGR environment is generated using VIO or SLAM position tracking or the like at the mobile electronic device. In some implementations, color images can be used. Alternatively, in some implementations, grayscale images can be used.

Figure 9:
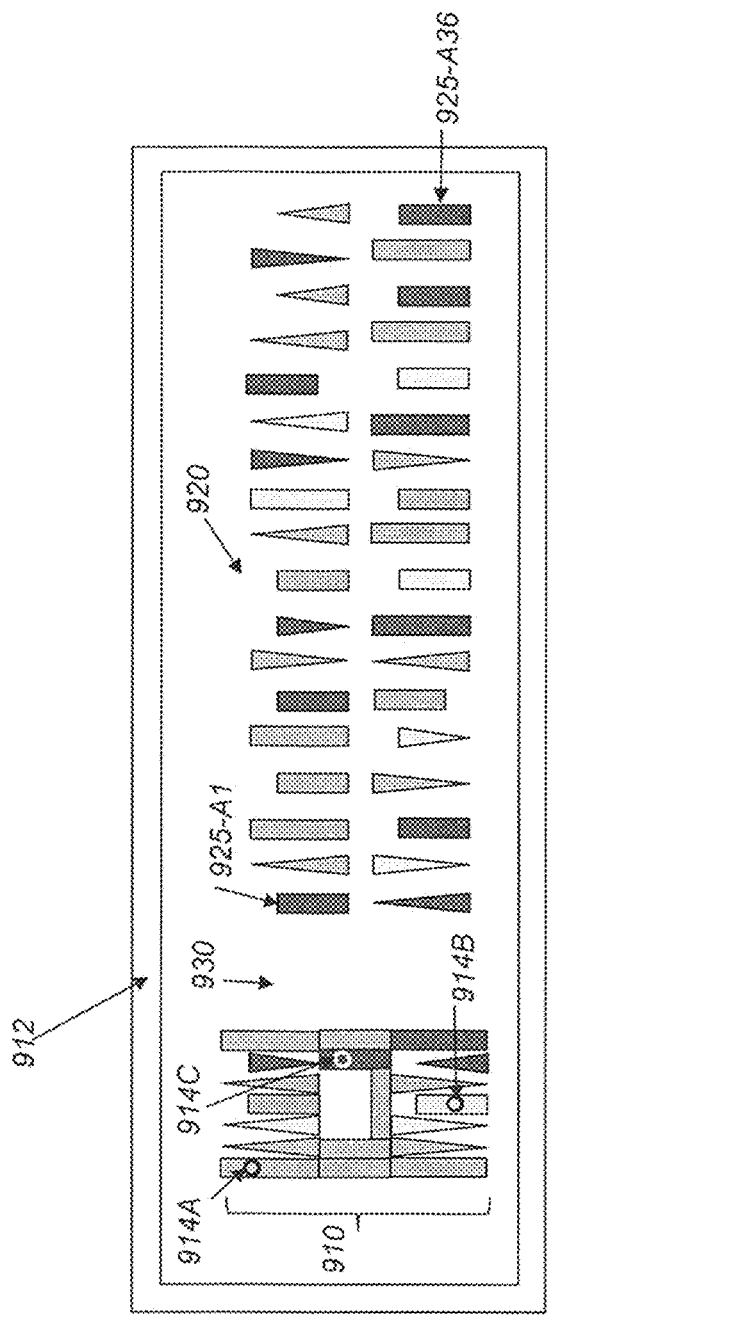
FIG. 9 is a diagram illustrating another exemplary visual marker with user selectable appearance in accordance with some implementations.

FIG. 9 is a diagram illustrating another exemplary visual marker with user selectable appearance in accordance with some implementations. As shown in FIG. 9, a visual marker 900 includes a first portion 910 for detection, a second portion 914 to identify the colors used in the visual marker 900, and a third portion 920 to encode data in the visual marker 900.

As shown in FIG. 9, the first portion 910 includes a standard shape for detection and rectification. In some implementations, the first portion 910 is a preset area such as a left central area including a specific predefined shape. In some implementations, colors of the first portion 910 are variable, and accordingly, the detection of the visual marker 900 is shaped-based and does not use color. In some implementations, the first portion 910 optionally includes a detection zone 912 as described herein. In some implementations, the detection of the visual marker 900 in an image can be accomplished using ML as described herein.

In some implementations, the second portion 914 identifies the colors used in the visual marker 900. As shown in FIG. 9, the visual marker 900 uses a plurality of 3 different colors (color A, color B, and color C). In some implementations, the second portion 914 includes known locations or positions in the first portion 910 (e.g., or elsewhere in the visual marker 900) that are each colored with one of the 3 colors used in the visual marker 900. As shown in FIG. 9, the second portion 914 includes locations 914A, 914B, and 914C. In the visual marker 900, the colors of the visual marker 900 can be any color.

As shown in FIG. 9, the third portion 920 encodes the data of the visual marker 900 using shape and color. In some implementations, the third portion 920 is a preset area such as lower rows using colored shapes. In FIG. 9, the third portion 920 includes 36 colored shapes 925-A1, 925-A2, . . . , 925-A36 sequentially ordered (e.g., top to bottom and left to right or lower to upper and right to left) from a starting position. In some implementations, the third portion 920 encodes the data of the visual marker 900 using a number, a length, a thickness, an outline, or a color of colored shapes 925. As shown in FIG. 9, the 36 colored shapes 925 include 2 lengths, 2 shapes, and 2 orientations.

In some implementations, the third portion 920 is separated from the first portion 910 by a gap 930. In some implementations, the gap 930 does not include any colored shapes. In some implementations, the gap 930 is one or more colors that are not used in the first portion 910 or the third portion 920.

In some implementations, a system includes a non-transitory computer-readable storage medium; and one or more processors coupled to the non-transitory computer-readable storage medium, wherein the non-transitory computer-readable storage medium includes program instructions that, when executed on the one or more processors, cause the system to perform exemplary methods disclosed herein. In some implementations, a non-transitory computer-readable storage medium, stores program instructions computer-executable on a computer to perform operations including exemplary methods disclosed herein.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor:
   detecting a visual marker depicted in an image of a physical environment, wherein the visual marker comprises:
   colored markings that encode data, and
   at least one space;
   identifying a color-interpretation scheme for interpreting the colored markings of the visual marker, wherein identifying the color-interpretation scheme comprises identifying:
   one or more colors associated with the at least one space; and
   a set of colors that are:
   based on the colored markings of the visual marker, and different from the one or more colors associated with the at least one space; and decoding the data of the visual marker based on the colored markings and the set of colors of the color-interpretation scheme.

2. The method of claim 1 further comprising:

detecting a second visual marker depicted in a second image;

identifying a second color-interpretation scheme for interpreting colored markings of the second visual marker that encode second data, wherein identifying the second color-interpretation scheme comprises identifying a second set of colors based on the second visual marker, wherein the second set of colors is different than the set of colors; and decoding the second data of the second visual marker based on the colored markings of the second visual marker and the second set of colors of the second color-interpretation scheme.

3. The method of claim 1, further comprising rectifying the visual marker by determining a relative position and orientation from the electronic device to the visual marker using a sensor of the electronic device.

4. The method of claim 1, further comprising rectifying the visual marker using a machine learning model, wherein the machine learning model is trained to identify orientation of the visual marker.

5. The method of claim 1, further comprising interpreting the visual marker to determine a version of the visual marker.

6. The method of claim 5, wherein the color-interpretation scheme is further determined based on the version of the visual marker.

7. The method of claim 1, further comprising decoding the data of the visual marker by decoding the colored markings based on sizes, shapes, colors of the colored markings.

8. The method of claim 1, wherein the visual marker comprises:

a first portion indicating the color-interpretation scheme and having a shape identifying an orientation of the visual marker; and a second portion comprising the colored markings that encode the data.

9. The method of claim 8, wherein the first portion is separated from the second portion.

10. The method of claim 1, wherein detecting the visual marker depicted in an image of a physical environment comprises:

analyzing the image with a first neural network to classify the image as containing the visual marker or not containing the visual marker; and analyzing the image with a second neural network trained for color invariant shape detection of the visual marker when the first neural network classifies the image as containing the visual marker.

11. The method of claim 10, where the first neural network is trained to detect a specific shape with predetermined ratio of dimensions and having a color, wherein the specific shape is a ring with a predetermined ratio of thickness to diameter.

12. A system comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

detecting a visual marker depicted in an image of a physical environment, wherein the visual marker comprises:

colored markings that encode data, and at least one space;

identifying a color-interpretation scheme for interpreting the colored markings of the visual marker, wherein identifying the color-interpretation scheme comprises identifying;

one or more colors associated with the at least one space; and a set of colors that are:

based on the colored markings of the visual marker, and different from the one or more colors associated with the at least one space; and decoding the data of the visual marker based on the colored markings and the set of colors of the color-interpretation scheme.

13. The system of claim 12, wherein the operations further comprise:

detecting a second visual marker depicted in a second image;

identifying a second color-interpretation scheme for interpreting colored markings of the second visual marker that encode second data, wherein identifying the second color-interpretation scheme comprises identifying a second set of colors based on the second visual marker, wherein the second set of colors is different than the set of colors; and decoding the second data of the second visual marker based on the colored markings of the second visual marker and the second set of colors of the second color-interpretation scheme.

14. The system of claim 12, wherein the operations further comprise rectifying the visual marker by determining a relative position and orientation from the system to the visual marker using a sensor of the system.

15. A non-transitory computer-readable storage medium, storing program instructions computer-executable on a computer to perform operations comprising:

at an electronic device having a processor:

detecting a visual marker depicted in an image of a physical environment, wherein the visual marker comprises:

colored markings that encode data, and at least one space;

identifying a color-interpretation scheme for interpreting the colored markings of the visual marker, wherein identifying the color-interpretation scheme comprises identifying:

one or more colors associated with the at least one space; and a set of colors that are:

based on the colored markings of the visual marker, and different from the one or more colors associated with the at least one space; and decoding the data of the visual marker based on the colored markings and the set of colors of the color-interpretation scheme.

16. The method of claim 1, wherein the set of colors comprises three different colors.

17. A method comprising:
at an electronic device having a processor:
- detecting a visual marker depicted in an image of a physical environment, wherein the visual marker comprises:
  - a first portion indicating a color-interpretation scheme; and
  - a second portion comprising colored markings that encode data, wherein the second portion is separated from the first portion;
- identifying, based on the color-interpretation scheme, a set of colors for interpreting the colored markings; and
- decoding the data of the visual marker based on the colored markings and the set of colors of the color-interpretation scheme.

18. The method of claim 17, wherein the first portion comprises a shape identifying an orientation of the visual marker.

19. The method of claim 17, further comprising:
- determining to interpret colored markings of a first color as representing a first value based on identifying the first color in the first portion; and
- determining to interpret colored markings of a second color as representing a second value based on identifying the second color in the first portion, wherein the second color is different than the first color.

20. The method of claim 19, further comprising:
- determining to interpret colored markings of a third color as representing a third value based on identifying the third color in the first portion, wherein the third color is different than the first color and different than the second color.

21. The method of claim 17, wherein the first portion and the second portion are separated by a space in the visual marker.

* * * * *